United States Patent [19]

Branen

[11] 4,160,800

[45] Jul. 10, 1979

[54] METHOD OF FORMING A COMPOSITE ROD

[75] Inventor: Kenneth E. Branen, Hudson, N.H.

[73] Assignee: Avco Corporation, Wilmington, Mass.

[21] Appl. No.: 822,234

[22] Filed: Aug. 5, 1977

[51] Int. Cl.² .............................................. B29C 25/00
[52] U.S. Cl. .................................... 264/345; 264/164; 264/234; 264/290 R
[58] Field of Search ............ 264/164, 234, 280, 290 R, 264/345, 172, 174

[56] References Cited

U.S. PATENT DOCUMENTS

| | | | |
|---|---|---|---|
| 3,001,265 | 9/1961 | Bundy | 264/280 |
| 3,275,730 | 9/1966 | Feild | 264/280 |
| 3,993,726 | 11/1976 | Moyer | 264/280 |

*Primary Examiner*—Paul R. Michl
*Attorney, Agent, or Firm*—Abraham Ogman

[57] ABSTRACT

The invention relates to a method of converting a flat composite strip to a round rod by changing the configuration of the strip composite to the round rod solely by the application of heat.

6 Claims, 2 Drawing Figures

METHOD OF FORMING A COMPOSITE ROD

DEFINITIONS

A "composite" material shall comprise the combination of filament reinforcements embedded and distributed within a matrix material. The filaments may be configured as a monolayer or multi-layer and randomly distributed throughout the cross section.

A "tow" is a filamentary structure made up of a multiplicity of monofilaments.

The "transition temperature" is the temperature range in which the viscosity of the matrix material is such that the material contracts into itself to form a minimum volume configuration.

BACKGROUND OF THE INVENTION

Round composite rods are generally made by extrusion or pultrusion. However, in the case of forming composite rods containing high-modulus high-strength filaments such as boron, silicon carbide, and graphite filaments, the prior art process becomes uneconomical. One important reason is that high-modulus high-strength filaments are generally first placed into a composite in a form of flat strips or sheets. Typically, a resin matrix or metal matrix composite contains a monolayer of filaments which have been laid up so that they lie substantially parallel to each other in a side-by-side relationship. The matrix is then cast around the filaments and either fully cured or partially cured into strips of composite materials or sheets of composite material. At times, such composite materials contain mulit-layers of filaments, either uniformly aligned or randomly aligned.

Boron and silicon carbide filaments are hard materials. The replacement costs of extrusion or pultrusion dies would be very high.

Heretofore, narrow strips of such composite materials have been used as reinforcements in a variety of products, but most notably in tennis rackets. It was then determined that performance could be improved if the composite reinforcement for tennis rackets was in the shape of a round rod rather than a flat strip. Given the conventional way of making such composite materials as flat structures, the problem was to convert such flat structures, and particularly flat strips, into round rods.

It is an object of the invention to provide a method of forming a round composite rod from a flat composite strip which avoids the limitations and disadvantages of prior art devices.

It is another object of the invention to provide a process of forming a round composite rod from a flat strip in a simple and facile manner.

It is yet another object of the invention to provide a method of forming a round composite rod from a flat composite strip to the sole use of heat without the use of dies of any type.

It is yet another object of the invention to provide a method of forming a round composite rod from a flat composite strip wherein the conversion can be made to conform with close tolerance requirements for the round composite rod.

In accordance with the invention, a method of forming a round composite rod from a flat composite strip comprises vertically suspending a flat composite strip containing longitudinally aligned filaments within a matrix, said matrix being capable of being softened. The temperature of a substantial length of the composite strip is raised to the transition temperature and maintained at the transition temperature until the cross section of the composite assumes a substantially round configuration. Finally, the round composite is solidified.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

DESCRIPTION OF THE INVENTION

Figure 1:
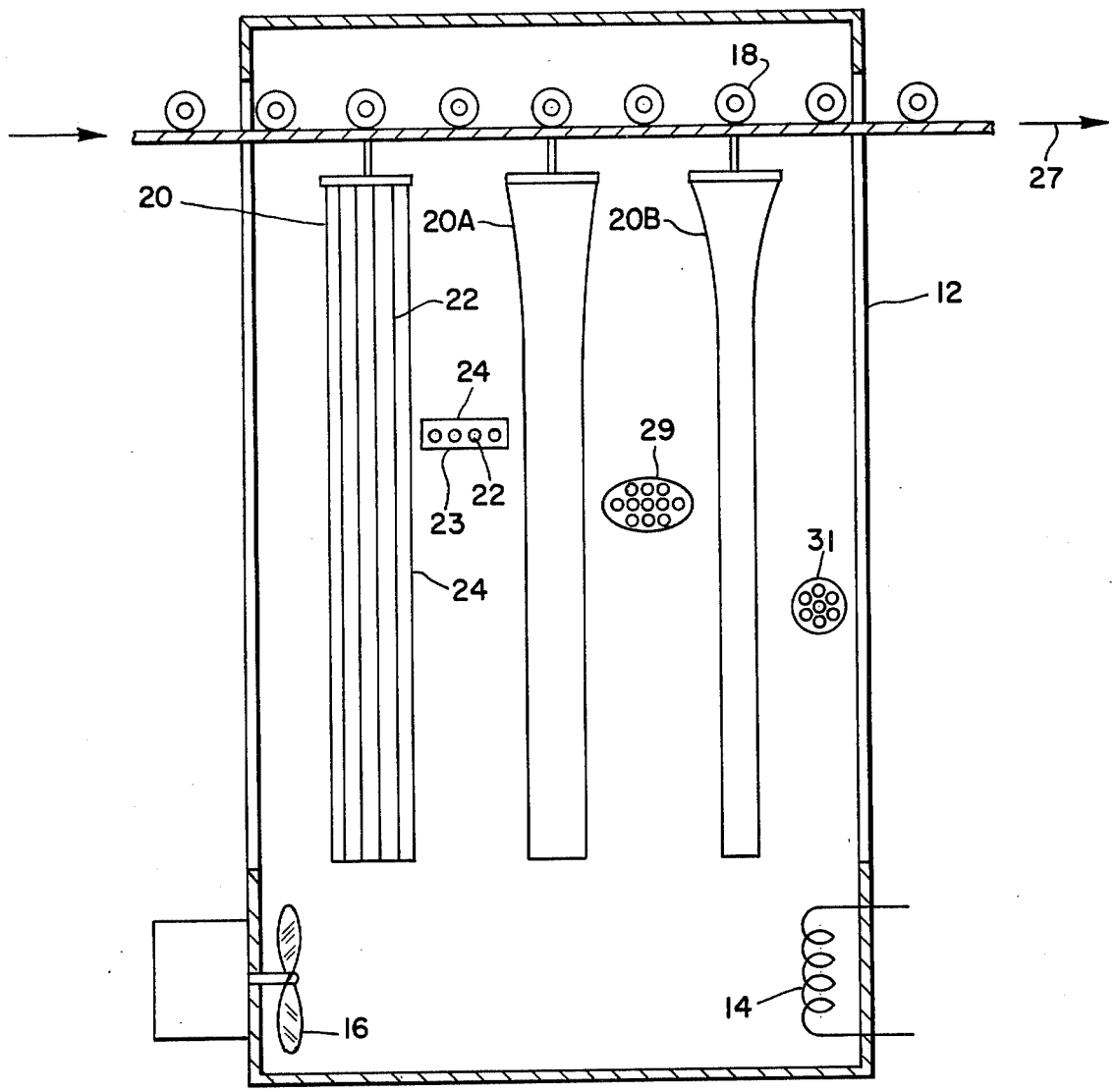
FIG. 1 is a schematic representation of the method for forming a round composite rod from a flat composite strip in discrete lengths.

Referring to FIG. 1, there is shown an oven 12 containing a heater 14 and a fan 16. The oven and associated components may be of a conventional nature to provide a uniform temperature through its interior.

Suspended from a conveyor 18 are three lengths of composite material 20, 20A, and 20B. The composite material 20 is formed from lengths of monofilament 22 embedded within a matrix material 24. The preferred distribution of the filaments is a side-by-side alignment in a monolayered structure such as shown at 23. Alternatively, a multi-layer filament configuration of the type previously described may be used.

The matrix material 24 in the preferred embodiment is a plastic resin such as epoxy, polyester, or other such system. In the event the resin is a thermosetting resin, the composite 20 is preferably a "B" staged prepreg configuration. In other words, the resin 24 is partially cured into a state where it can be conventionally handled. If heated to cure the composite, its viscosity first decreases and then increases to a solid condition. In the event the matrix 24 is a thermoplastic material, it can be used in the solid configuration as it will revert to a more plastic state when heated in the oven. Alternatively, the matrix 24 may comprise a material such as aluminum or titanium.

The essential property of the matrix is that it can be softened sufficiently to contract into itself when raised to what has been defined herein as the transition temperature.

While the process will work with most forms of monofilaments, the preferred monofilaments are made from boron, silicon carbide, or carbonaceous, all of which are sold in commerce, generally in 4, 5.6, and 8 mil diameters. A monofilament rather than a tow is preferred. So-called "graphite" filaments are, in fact, tows of about 1,600 monofilaments. When the procedure described herein was tried with such a tow, it did not work very well.

The process works as follows. A flat composite strip 20 is mounted on a conveyor 18 and moves into the oven 12 in the direction of the arrow 27. The flat strip 20 is secured only at the top. Its bottom marginal edge is not clamped or restrained in any way. The unclamped bottom edge is an important step of the process. The bottom edge needs to be free to contract and results in a more uniform rod.

As the strip 20 moves through the oven from left to right, it is heated and it begins to contract into itself. Its cross section shape 23 begins to change, and at 20A, a curve section 29, approximating an ellipse, begins to take shape. At the far right of the oven 12, 20B illustrates a fully formed rod having a circular cross section such as shown at 31. Throughout, the filaments remain in a substantially parallel relationship. Surprisingly, close tolerance can be maintained throughout by judiciously maintaining the process parameters. A quarter-inch boron epoxy strip containing 50 4 mil diameter boron filaments converts into a rod having a 40 mil diameter. Close tolerance on the finished product can be maintained.

In the preferred embodiment, a ¼ wide strip having 50 boron monofilaments configured in monolayer within an epoxy resin prepregged matrix was placed in an oven and heated to its curing temperature of about 350° F. A uniform rod was formed. The specific epoxy used is sold under the tradename of Rigidite 5505 by Avco Corporation. A configuration change from a strip to a rod using the same resin and filament was also performed at about 250° F.

Figure 2:
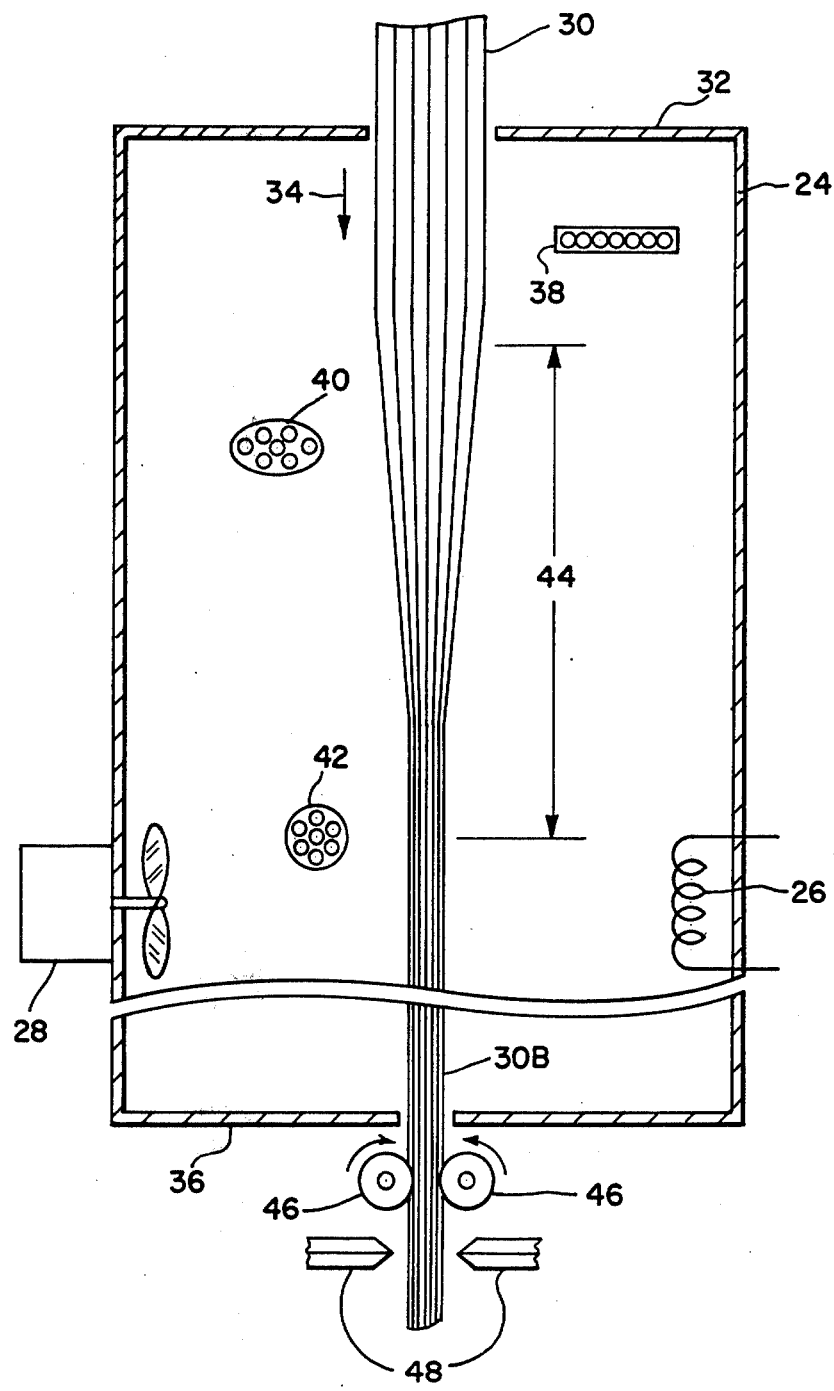
FIG. 2 depicts an alternate arrangement whereby the transformation takes place in a continuous length of material.

Reverting to FIG. 2, there is shown an alternate way of practicing the procedure where it is desired to process continuous lengths of a flat composite strip. In FIG. 2 there is an oven 24, a heater 26, and a fan 28 to provide an elevated processing temperature within the oven. A continuous length of flat strip 30 is supplied to the interior of the oven through a top wall 32. The flat strip 30 traverses downwardly in the direction of the arrow 34. As it moves, it becomes heated and begins to contract into itself in the manner heretofore described and leaves the oven by way of a bottom wall 36 as a rod. The transition from a flat strip to a round rod is shown at 38, 40, and 42, respectively. The transition takes place within the center of the oven within the region identified by the symbol 44.

A pair of wheels 46 continuously draw the rod 30B from the oven. A pair of cutters 48 may be used to cut the rod into discrete lengths, if desired.

It is important that the height of the oven be greater than the transition region 44 by a substantial amount so that the flat strip 30 can undergo its transformation into a rod 30B without the transition being influenced by the rollers or any other guide means that may be provided for the rod 30B.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A method of forming a round composite rod from a flat composite strip comprising:
    vertically suspending a flat composite strip containing longitudinally aligned monofilaments within a matrix that softens when heated;
    raising the temperature of a substantial length of the composite strip to its transition temperature and maintaining the composite strip at said temperature until the cross section of the composite assumes a substantially round configuration; and
    fully solidifying said composite.

2. A method as described in claim 1 where the composite strip is a definitive length and it is suspended or constrained at the top only.

3. A method as described in claim 1 wherein said monofilaments are in a monolayer.

4. A method as described in claim 1 wherein said monofilaments are selected from the class consisting essentially of boron, silicon carbide, or graphite monofilaments.

5. A method as described in claim 1 wherein the flat strip is continuous and is moved from top to bottom through an oven having a height substantially greater than the vertical region within the oven wherein the strip is transformed into a rod.

6. A method as described in claim 1 where the matrix is a thermosetting, thermoplastic, or metal.

* * * * *